United States Patent
Wu et al.

(10) Patent No.: US 12,206,624 B2
(45) Date of Patent: Jan. 21, 2025

(54) LINK MONITORING METHOD AND TERMINAL

(71) Applicant: VIVO MOBILE COMMUNICATION CO., LTD., Dongguan (CN)

(72) Inventors: Kai Wu, Dongguan (CN); Gen Li, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 383 days.

(21) Appl. No.: 17/723,436

(22) Filed: Apr. 18, 2022

(65) Prior Publication Data
US 2022/0247522 A1    Aug. 4, 2022

Related U.S. Application Data

(63) Continuation of application No. PCT/CN2020/128934, filed on Nov. 16, 2020.

(30) Foreign Application Priority Data

Nov. 19, 2019 (CN) .......................... 201911137467.X

(51) Int. Cl.
*H04L 5/00* (2006.01)
*H04B 17/309* (2015.01)

(52) U.S. Cl.
CPC ........... *H04L 5/006* (2013.01); *H04B 17/309* (2015.01); *H04L 5/0051* (2013.01)

(58) Field of Classification Search
CPC ..... H04L 5/006; H04L 5/0051; H04L 5/0048; H04L 43/0805; H04B 17/309; H04B 17/17; H04B 7/0632; H04W 24/10
USPC .................................................... 455/452.1
See application file for complete search history.

(56) References Cited

U.S. PATENT DOCUMENTS

2014/0362720 A1    12/2014    Kim et al.
2017/0150444 A1    5/2017    Li et al.

FOREIGN PATENT DOCUMENTS

| CN | 103974278 A | 8/2014 | |
| CN | 107787005 A | 3/2018 | |
| CN | 110419188 A | * 11/2019 | ........... H04B 7/0626 |
| WO | 2014069956 A1 | 5/2014 | |
| WO | 2019029608 A1 | 2/2019 | |
| WO | 2019139254 A1 | 7/2019 | |

OTHER PUBLICATIONS

Hearing Notice issued in related Indian Application No. 202217034623, mailed Feb. 20, 2024, 3 pages.

(Continued)

*Primary Examiner* — Tanmay K Shah
(74) *Attorney, Agent, or Firm* — IPX PLLC

(57) ABSTRACT

The present disclosure provides a link monitoring method and a terminal. The method includes: according to whether a monitoring object is present in a first period, determining a link monitoring behavior, wherein the behavior includes at least one of the following: reporting link quality information, not reporting link quality information, evaluating link quality or not evaluating link quality. According to embodiments of the present disclosure, the ability of the terminal to monitor the link can be improved.

19 Claims, 4 Drawing Sheets

(56) References Cited

OTHER PUBLICATIONS

First Office Action issued in related Chinese Application No. 201911137467.X, mailed Aug. 1, 2022, 11 pages.
Huawei et al, "Discussion on L1 indication period for RLM and BFD", 3GPP TSG-RAN WG4 Meeting #90bis R4-1903720, Apr. 2019, 7 pages.
International Search Report issued in corresponding International Application No. PCT/CN2020/128934, mailed Feb. 19, 2021, 4 pages.
Samsung, "Issues on CSI reporting", 3GPP TSG RAN WG1 Meeting AH 1801 R1-1800430, Jan. 26, 2018.
Office Action issued in related Japanese Application No. 2022-528725, mailed May 16, 2023, 4 pages.
MediaTek Inc, "Discussion on RLM requirement for NR-U", 3GPP TSG-RAN WG4 Meeting #93 R4-1914077, Nov. 2019, 8 pages.
Extended European Search Report issued in related European Application No. 20890834.3, mailed Dec. 8, 2022, 9 pages.
Vivo, "Discussion on initial access procedure for NR-U", 3GPP TSG-RAN WG1 Meeting #99 R1-1912013, Nov. 2019, 8 pages.
Vivo, "Remaining issues on initial access procedures", 3GPP TSG-RAN WG1 #102 R1-2005334, Aug. 2019, 4 pages.
Examination Report issued in related Indian Application No. 202217034623, mailed Oct. 25, 2022, 6 pages.

\* cited by examiner

Network device

Terminal

LINK MONITORING METHOD AND TERMINAL

CROSS-REFERENCE TO RELATED APPLICATIONS

This application is a continuation of International Application No. PCT/CN2020/128934, filed Nov. 16, 2020, which claims priority to Chinese Patent Application No. 201911137467.X, filed Nov. 19, 2019. The entire contents of each of the above-referenced applications are expressly incorporated herein by reference.

TECHNICAL FIELD

The present disclosure relates to the technical field of communication, and in particular, to a link monitoring method and a terminal.

BACKGROUND

Terminals in some communication systems (for example 5G system) often need to monitor links. For example: for the radio link monitoring process, the terminal monitors a monitoring object such as a Radio Link Monitoring Reference Signal (RLM-RS), for the beam failure detection process, the terminal monitoring a monitoring object such as a Beam Failure Detection Reference Signal (BFD-RS), and the monitoring process is often performed periodically. However, at present, the process that the terminal reports link quality information and evaluates link quality is performed on the premise of assuming that monitoring objects are all present in all periods, that is, reporting the link quality information and evaluating the link quality are performed correspondingly for all the periods, resulting in low link monitoring ability of the terminal.

SUMMARY

According to a first aspect, embodiments of the present disclosure provide a link monitoring method, applied to a terminal. The link monitoring method includes: according to whether a monitoring object is present in a first period, determining a link monitoring behavior, and the behavior includes at least one of the following:

reporting link quality information, not reporting link quality information, evaluating link quality, or not evaluating link quality.

According to a second aspect, embodiments of the present disclosure provide a terminal, including:

a determination module, configured to, according to whether a monitoring object is present in a first period, determine a link monitoring behavior, and the behavior includes at least one of the following:

reporting link quality information, not reporting link quality information, evaluating link quality or not evaluating link quality.

According to a third aspect, embodiments of the present disclosure provide a terminal, including: a memory, a processor, and a program stored in the memory and capable of running on the processor, and when the program is executed by the processor, the steps of the link monitoring method provided by the embodiments of the present disclosure are implemented.

According to a fourth aspect, embodiments of the present disclosure provide a non-transitory computer-readable storage medium. The non-transitory computer-readable storage medium stores a computer program, and when the computer program is executed by a processor, the steps of the link monitoring method provided by the embodiments of the present disclosure are implemented.

DETAILED DESCRIPTION

The following clearly describes the technical solutions in the embodiments of the present disclosure with reference to the accompanying drawings in the embodiments of the present disclosure, the described embodiments are a part rather than all of the embodiments of the present disclosure. All other embodiments obtained by a person of ordinary skill in the art based on the embodiments of the present disclosure shall fall within the protection scope of the present disclosure.

The term "include" and any other variants in the specification and claims of the present disclosure mean to cover the non-exclusive inclusion, for example, a process, method, system, product, or device that includes a list of steps or units is not necessarily limited to those steps or units, but may include other steps or units not expressly listed or inherent to such a process, method, product, or device. In addition, "and/or" used in the description and the claims means at least one of the connected objects. For example, A and/or B represents the following three cases: Only A exists, only B exists, and both A and B exist.

In the embodiments of the present disclosure, the term such as "exemplary" or "for example" is used to represent an example, an instance, or a description. Any embodiment or design solution described as "exemplary" or "for example" in the embodiments of the present disclosure should not be construed as being more preferred or advantageous than other embodiments or design solutions. To be precise, the use of the term such as "exemplary" or "for example" is intended to present a related concept in a specific manner.

Embodiments of the present disclosure will be described below with reference to the accompanying drawings. The link monitoring method and the terminal provided by the embodiments of the present disclosure can be applied to a wireless communication system. The wireless communication system may be a New Radio (NR) system, or other systems, for example: an Evolved Long Term Evolution (eLTE) system or a Long Term Evolution (LTE) system, or a subsequent evolved communication system. Further, the link monitoring method and the terminal provided by the embodiments of the present disclosure can be applied to an unlicensed band in the wireless communication system.

Figure 1:
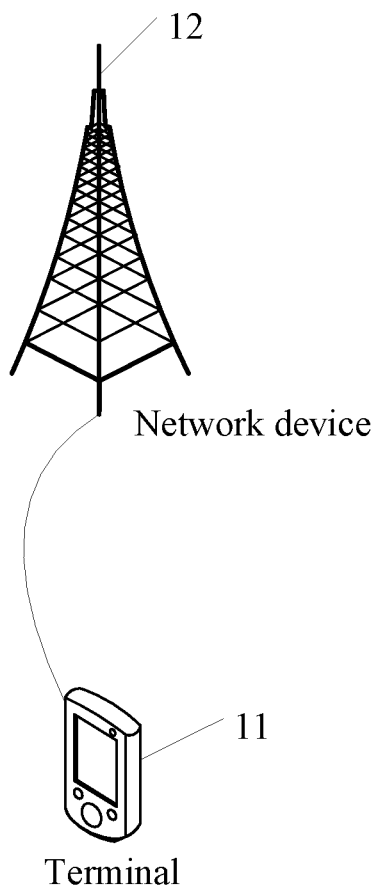
FIG. 1 is a structural diagram of a network system applicable to an embodiment of the present disclosure.

Referring to FIG. 1, FIG. 1 is a structural diagram of a network system applicable to an embodiment of the present disclosure. As shown in FIG. 1, the network system includes a terminal 11 and a network device 12, and the terminal 11 may be User Equipment (UE) or other terminal side devices, for example: a mobile phone, a tablet personal computer, a laptop computer, a Personal Digital Assistant (PDA), a Mobile Internet Device (MID), a wearable device, or a robot. It should be noted that a specific type of the terminal 11 is not limited in the embodiments of the present disclosure. The network device 12 may be a 4G base station, or a 5G base station, or a base station of a later version, or a base station in other communication systems, or is called a node B, an evolved node B, or a Transmission Reception Point (TRP), or an Access Point (AP), or other vocabulary in the field. As long as the same technical effect is achieved, the network device is not limited to a specific technical vocabulary. In addition, the network device 12 may be a Master Node (MN) or a Secondary Node (SN). It should be noted that in the embodiments of the present disclosure, only the 5G base station is used as an example, but a specific type of the network device is not limited.

Further, embodiments of the present disclosure may also be applied to the scenarios of sidelink (sidelink, or translated as a direct communication link) transmission, that is, the scenarios capable of directly performing data transmission among terminals.

Figure 2:
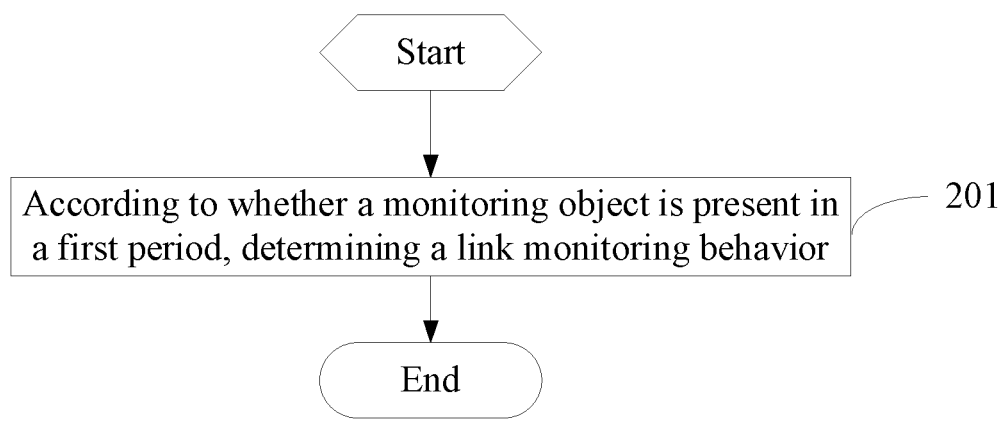
FIG. 2 is a flowchart of an uplink resource determining method according to an embodiment of the present disclosure.

Referring to FIG. 2, FIG. 2 is a flowchart of a sidelink monitoring method according to an embodiment of the present disclosure. The method is applied to a terminal. As shown in FIG. 2, the method includes the following steps:

Step 201: according to whether a monitoring object is present in a first period, determining a link monitoring behavior, and the behavior includes at least one of the following:

reporting link quality information, not reporting link quality information, evaluating link quality or not evaluating link quality.

The first period may include one or a plurality of indication periods, for example: the first period is one or a plurality of indication periods, or the first period is an evaluation period, and the evaluation period may include one or a plurality of indication periods. The indication period may be a period for monitoring a monitoring object, or is called a period for sending a monitoring object, but does not indicate that monitoring objects must be present in all the indication periods. For example: the indication period is a period for periodically sending RLM-RS, but due to some reasons, the network device does not send RLM-RS in a certain or a plurality of indication periods, so that RLM-RS is not present in these indication periods. In addition, one indication period may be configured to monitor one or a plurality of monitoring objects. The evaluation period may be a period including one or a plurality of indication periods.

For example: for RLM, in a case that Discontinuous Reception (DRX) is not configured, it may be the indication period T (Indication_interval)=max (10 ms, $T_{RLM-RS,M}$), and $T_{RLM-RS,M}$ is the minimum period in all configured RLM-RS.

For RLM, in a case that DRS is configured, when the DRX cycle length is less than or equal to 320 ms, it may be the indication period T=Max (10 ms, 1.5*DRX_cycle_length, 1.5*$T_{RLM-RS, M}$), and DRX_cycle_length indicates the DRX cycle length; and when the DRX cycle length is greater than 320 ms, the indication period may be the DRX cycle length. After the T310 timer is started, the terminal may perform evaluation and reporting according to the indication period when no DRX is configured.

For another example: for BFD, in a case that DRX is not configured, it may be the indication period T=max(2 ms, $T_{BFD-RS,M}$), and $T_{BFD-RS,M}$ is the minimum period in all configured BFD-RS.

For BFD, in a case that DRX is configured, when the DRX cycle length is less than or equal to 320 ms, TIndication_interval=Max(1.5*DRX_cycle_length, 1.5*$T_{BFD-RS,M}$); and when the DRX cycle length is greater than 320 ms, the indication period is the DRX cycle length.

In addition, in the embodiments of the present disclosure, the indication period may also be called an indication interval.

It should be noted that in the embodiments of the present disclosure, the indication period and the evaluation period are not limited, for example: they may be an indication period and an evaluation period which have been defined in a protocol, or may also be an indication period and an evaluation period which are newly defined in the subsequent protocol version.

Whether the monitoring object is present in the first period may be whether the network device or terminal which sends the monitoring object sends the monitoring object in the period. For example: in an unlicensed band, the network configures periodically sent RLM-RS for the terminal. Since the network side performs channel listening before the RLM-RS sending time, it is determined that the channel cannot be used by the network side in the sending time, resulting in that the RLM-RS which should be sent in a certain time point configured by the network, then RLM-RS is not present in the first period corresponding to the time point. For another example: non-periodic service is present in the sidelink, the sending terminal cannot ensure to periodically send the monitoring object when the non-periodic service is performed, so that the monitoring object may not be present in some first periods; or the sidelink terminal needs to acquire a resource for sending through sensing, so the acquired resource also has time uncertainty, the time resource of the monitoring object also has uncertainty, and it may not ensure to periodically send the monitoring object in the sidelink, that is, the monitoring object may not be present in some first periods.

The determining the link monitoring behavior according to whether the monitoring object is present in the first period may be: determining the link monitoring behavior according to the result whether the monitoring object is present in the first period. For example: the monitoring object is not present in the first period, then it may be determined not to report link quality information and or not to evaluate link quality; or the monitoring object is present in the first period, then it is determined to report link quality information and/or evaluate link quality. Specifically, for example: a monitoring object a is present in the first period, but a monitoring object b is not present, so that it may be determined to evaluate link quality based on the monitoring object a, and it may be determined to evaluate link quality and report link quality information not based on the monitoring object b; or any monitoring object is not present in the first period, so that it is determined not to report link quality information and/or not to evaluate link quality.

It should be noted that in the embodiments of the present disclosure, the link may be a radio link at the unlicensed band or a radio link at the sidelink band.

In the embodiments of the present disclosure, the link quality information may include link In-Sync (IS) or Out-of-Sync (OOS), or may include link failure or non-failure, or may include beam failure or non-failure, or other link quality-related information. Further, the link quality information may include the evaluation result of evaluating the link quality. It should be noted that in the embodiments of the present disclosure, reporting link quality information and evaluating link quality are not limited, for example: reporting link quality information and evaluating link quality may be performed in a way defined in the protocol, or may be performed in a way newly introduced in the subsequent protocol version.

In the embodiments of the present disclosure, the link monitoring behavior may be determined according to the actual situation of whether the monitoring object is present in the period, so that the link monitoring ability of the terminal can be improved, and the precision of link quality detection can be further improved.

As an optical implementation manner, the monitoring object includes:

the monitoring object of RLM or the monitoring object of BFD.

The monitoring object of RLM may include at least one of the following: a Channel-State Information Reference Signal (CSI-RS), a Synchronization Signal Block (SSB), a Demodulation Reference Signal (DMRS), and Hybrid Automatic Repeat Request (HARQ) information. The CSI-RS, SSB, or DMRS may be called RLM-RS.

The monitoring object of BFD may include at least one of the following: CSI-RS, SSB, DMRS, and HARQ information. The CSI-RS, SSB, or DMRS may be called BFD-RS.

The DMRS may be DMRS of a Physical Sidelink Feedback Channel (PSFCH), and the HARQ information may also be HARQ information of the PSFCH. Of course, the DMRS may also be DMRS of a Physical Downlink Control Channel (PDCCH), or Physical Downlink Shared Channel (PDSCH), or HARQ information.

It should be noted that in the embodiments, the monitoring object of RLM may include one or a plurality of monitoring objects, for example: RLM-RS may include one or a plurality of Channel-State Information Reference Signal (CSI-RS) and one or a plurality of Synchronization Signal Block (SSB), the BFD-RS may also include one or a plurality of CSI-RS and one or a plurality of SSB; of course, it may also be that the monitoring object of RLM includes at least two of RLM-RS, DMRS and HARQ information, and each one may include one or a plurality of monitoring objects, similarly, the monitoring object of BFD may also include one or a plurality of monitoring objects. Specifically, it may be that the monitoring object in one indication period may include one or a plurality of monitoring objects, for example, RLM-RS in one indication period may include one or a plurality of CSI-RS.

In addition, when the RLM process or the BFD process is performed by DMRS or HARQ information, the RLM process or the BFD process may be performed by CSI-RS or SSB, of course, which is not limited to this. The RLM process or the BFD process may also be performed by other modes.

It should be noted that in the embodiments of the present disclosure, the monitoring object is not limited, for example: the monitoring object may also be various physical channels, such as PDCCH, PDSCH and PSFCH or DMRS corresponding to these channels. In addition, in the embodiments of the present disclosure, the monitoring objects are not limited to the monitoring objects of RLM and BFD, for example: the monitoring object in the step 201 may include at least one of DMRS and HARQ information, and the at least one may be used for other monitoring of links except for RLM and BFD.

The reporting link quality information refers to reporting link quality information to a Media Access Control (MAC) layer or a layer 3 of the terminal; and/or the not reporting link quality information refers to not reporting link quality information to the MAC layer or layer 3 of the terminal.

As an optional implementation manner, the monitoring object is configured by a network, pre-defined, pre-configured, or indicated by a sidelink terminal.

The number of the monitoring objects included in the first period may be configured by a network, pre-defined, pre-configured or indicated by a sidelink terminal, for example: for one link monitoring process, such as radio link monitoring or beam failure detection, the network may configure one or a plurality of monitoring objects, for example, the network may configure one or a plurality of CSI-RS and/or one or a plurality of SSB.

As an optional implementation manner, in a case that a monitoring object is not present in the first period, the behavior includes not reporting link quality information or not evaluating link quality.

That the monitoring object is not present in the first period may be: any monitoring object is not present in the first period, or part of the monitoring objects are not present in the first period, for example: the first period is used to monitor a plurality of monitoring objects, then part of the monitoring objects may be present, but the other part of the monitoring objects is not present. For example, for RLM, CSI-RS may be present in the first period, but SSB is not present, or one CSI-RS is present in the first period, and the other CSI-RS is not present.

The not reporting link quality information may be link quality information reporting not based on the monitoring object which is not present, or link quality information reporting not based on all monitoring objects in the first period.

The not evaluating link quality may be evaluating link quality not based on the monitoring object which is not present. For example: for RLM-RS/BFD-RS, in a case that there is no available RS in the indication period in the evaluation period, not reporting link quality information, or evaluating link quality without using RS which is unavailable in the indication period.

In this implementation manner, the monitoring object is not present in the first period, the behavior includes not reporting link quality information or not evaluating link quality, thereby preventing from using the unavailable monitoring object to report link quality information or evaluate link quality, and improving the link monitoring quality.

Figure 3:
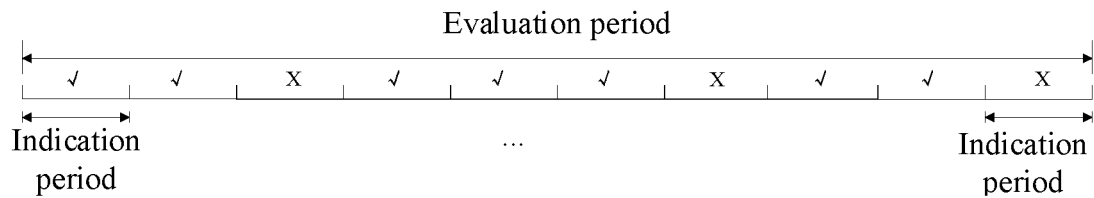
FIG. 3 is a schematic diagram of an evaluation period according to an embodiment of the present disclosure.

For example, as shown in FIG. 3, the length of the evaluation period of the terminal is W times the indication period. In the current indication period, the terminal comprehensively evaluates the link quality based on RS in the current indication period and RS in the previous W−1 indication periods.

In a case that corresponding RS is not detected in the current indication period, for example, all the RLM-RS/

BFD-RS configured by the network are unavailable, the terminal does not evaluate and/or report link quality in the current indication period.

In a case that the network configures W RLM-RS and all the RS are unavailable in the current indication period, the terminal does not evaluate and/or report link quality evaluation.

As an optical implementation manner, N monitoring objects are monitored in the first period, in a case that M monitoring objects are not present in the first period, the behavior includes: not reporting link quality information, N is an integer greater than or equal to 1, and the M is an integer less than or equal to the N.

That N monitoring objects are monitored in the first period may be: the first period is used to monitor N monitoring objects, for example: the N monitoring objects may include one or a plurality of CSI-RS and one or a plurality of SSB. That the M is an integer less than or equal to the N may be understood that in a case that all or part of monitoring objects are not present in the first period, link quality information is not reported or link quality is not evaluated. For example, all or part of monitoring objects are unavailable in the indication period, that is, it is not detected that the target object is sent, then the terminal does not report link quality information. The M may be an integer which is configured for high-layer parameters, and is greater than or equal to 1 and less than or equal to N.

In this implementation manner, in a case that M object objects are not present in the first period, link quality information is not reported, so that the precision of the link quality information is improved.

As an optional implementation manner, in a case that a first monitoring object is not present in the first period, but a second monitoring object is present, the behavior includes: evaluating link quality not based on the first monitoring object and evaluating link quality based on the second monitoring object.

For RLM link monitoring or BFD link monitoring, the first monitoring object and the second monitoring object may be different monitoring objects, for example: different SSB, CSI-RS, or DMRS.

In this implementation manner, the link quality information may be reported according to that the monitoring object is present to evaluate link quality, of course, the link quality information may also be reported according to the link quality evaluated by the monitoring object, and the link quality may be evaluated not based on the first monitoring object, so that the link measurement precision is improved. For example, part of target objects are unavailable in the indication period, then the terminal evaluates link quality according to the available target object.

For example: in a case that the network configures T RS for the terminal to serve as RLM, and in a case that H (H<T) RS are unavailable in the current indication period, that is, the terminal does not detect the RS, the terminal performs RLM evaluation only based on T-H RS in the current indication period; in a case that the evaluation result of all RS in T-H RS is higher than a PDCCH-block error rate (PDCCH-BLER) corresponding to a threshold value Qout, Out-of-Sync (OOS) is indicated to a higher layer; and for RLM, in a case that the evaluation result of one RS of the available RS is lower than a PDCCH-BLER threshold corresponding to a threshold value Qin, In-Sync (IS) is indicated to the higher layer.

In a case that the network configures T RS for the terminal to serve as BFD and in a case that H (H<T) RS are unavailable in the current indication period, that is, the terminal does not detect the RS, the terminal performs BFD evaluation only based on T-H RS in the current indication period; and in a case that the evaluation results of all RS of the T-H RS are all higher than a PDCCH-BLER threshold corresponding to a threshold value Qout, Beam Failure Indication (BFI) is indicated to the higher layer.

Figure 4:
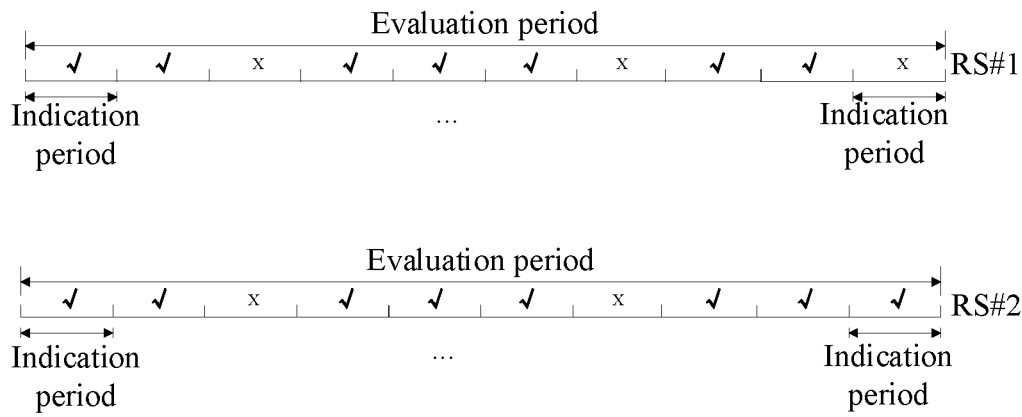
FIG. 4 is a schematic diagram of another evaluation period according to an embodiment of the present disclosure.

In addition, as shown in FIG. 4, in a case that 2 RS is configured for link monitoring, RS1 is unavailable in the current indication period, but RS2 may be available, radio link quality is evaluated according to RS2.

As an optical implementation manner, the monitoring object includes a third monitoring object, the first period is an indication period corresponding to the third monitoring object, an evaluation period includes K indication periods, and K is an integer greater than or equal to 1. The method further includes:

in a case that the third monitoring object is not present in an indication period in the evaluation period, prolonging the evaluation period by one or a plurality of indication periods, and the prolonged part is located before the starting indication period of the evaluation period.

That the prolonged part is located before the starting indication period of the evaluation period may be: one or a plurality of indication periods before the evaluation period are prolonged into the evaluation period. That is, prolonging in this implementation manner is prolonging along a direction of time regression.

The third monitoring object may be one of a plurality of monitoring objects used in link monitoring, for example: RLM-RS configures a plurality of RS, then the third monitoring object may be one of the plurality of RS. Or the third monitoring object may be SSB, CSI-RS, DMRS, or HARQ information.

That the third monitoring object is not present in the evaluation period may be that the third monitoring object is not present in one or a plurality of indication periods in the evaluation period.

In this implementation manner, when the monitoring object is not present in part of indication periods in the evaluation period of link quality evaluation, the evaluation period is extended forward, so that the number of the monitoring objects present in the evaluation period is increased, and the precision of link evaluation is improved.

In some embodiments, the step "in a case that the third monitoring object is not present in an indication period in the evaluation period, prolonging the evaluation period by one or a plurality of indication periods" includes:

in a case that the third monitoring object is not present in J indication periods in the evaluation period, prolonging the evaluation period by J indication periods, or prolonging the evaluation period until the prolonged indication period includes J indication periods for monitoring the third monitoring object, and the J is an integer less than or equal to the K.

That the evaluation period is prolonged by J indication periods can increase the number of the monitoring objects present in the evaluation period, so that the precision of link evaluation is improved. That the evaluation period is prolonged forward until the prolonged indication period includes J indication periods for monitoring the third monitoring object can ensure that the number of the third monitoring object present in the evaluation period is as same as that of the third monitoring object configured in the evaluation period, so that the precision of link evaluation is further improved.

In some embodiments, the step "in a case that the third monitoring object is not present in an indication period in the evaluation period, prolonging the evaluation period by one or a plurality of indication periods" includes:

in a case that the third monitoring object is present in the first period and the third monitoring object is not present in at least one indication period in the evaluation period, prolong the evaluation period by one or a plurality of indication periods.

That the third monitoring object is present in the first period and the third monitoring object is not present in at least one indication period of the evaluation period may be: the third monitoring object is not present in some indication periods in the evaluation period and before the first period, but the third monitoring object is present in the first period. In this way, the evaluation period can be prolonged as long as it is detected that the third monitoring object is present, so that the prolonged evaluation period can include more third monitoring objects, and the evaluation precision can be improved. Furthermore, the prolonging one or a plurality of indication periods may be: prolonging J indication periods with reference to the evaluation period, or prolonging the evaluation period until the prolonged indication period includes J indication periods for monitoring the third monitoring object.

Figure 5:
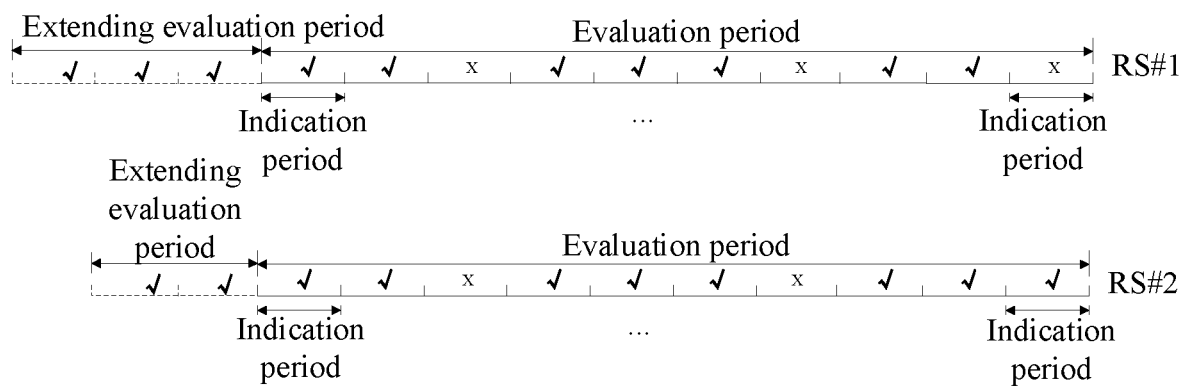
FIG. 5 is a schematic diagram of another evaluation period according to an embodiment of the present disclosure.

For example, one evaluation period may include a plurality of indication periods. For a certain RS, in a case that there is no available RS in part of the indication periods, the evaluation period can be prolonged forward. For a certain configured RS, there is no available RS in X indication periods in the evaluation period, then the evaluation period is extended forward, so that the forward extended time period can include X indication periods in which the available RS is present. As shown in FIG. 5, for different RS, the number of the indication periods in which RS is not present may be different in the evaluation period, so the length of the forward extended evaluation period may be different. Or it may be considered that the length of the evaluation period is a dynamic length, which is a length corresponding to the number of the indication periods which include RS and can be accommodated in the evaluation period.

In some embodiments, the behavior of extending the evaluation period may be extending the evaluation period of the RS forward only in a case that the current indication period includes the RS. In a case RS is not included, the RS is not used to perform link quality evaluation in the current indication period. As shown in FIG. 5, only RS2 is evaluated, and the evaluation period is prolonged.

Further, the extended evaluation length or the length of the total evaluation period after extension may be further limited, for example, the extended evaluation time length or the length among the extended evaluation periods cannot exceed Y indication periods. The maximum length may be configured by the network, or may be a preset value.

As an optional implementation manner, in a case that the monitoring object is one of the monitoring objects of RLM and the monitoring object of BFD, the method further includes at least one of the following:

in a case that the terminal runs a Radio Link Failure (RLF) timer and a monitoring object is not present in the first period, prolonging a duration of the RLF timer; and in a case that the terminal runs a beam failure detection timer and a monitoring object is not present in the first period, prolonging a duration of the beam failure detection timer.

The prolonging the duration of the RLF timer may be indicating a higher layer to prolong the RLF timer, and prolonging the RLF timer by the higher. The prolonging the duration of the beam failure detection timer may be: indicating the higher layer to prolong the beam failure detection timer, and prolonging the beam failure detection timer by the higher layer. Of course, in this embodiment, it is not limited to indicating the higher layer to prolong the timer, and may also be: indicating other layers to prolong the timer. In addition, the prolonging may be: prolonging one or a plurality of indication periods.

For example: for RLM, in the running period of the T310 timer, in a case that RLM-RS is not present in one indication period, the terminal automatically prolongs the T310, for example, indicating the upper layer T310 timer to prolong, in some embodiments, prolong one indication period.

For BFD, in a case that there is no available BFD-RS in one indication period, the terminal automatically prolongs the beam failure detection timer, for example, indicating the upper layer beam failure detection timer to prolong, in some embodiments, prolong one indication period.

In this implementation manner, the duration of the RLF timer and the beam failure detection timer can be prolonged, so the precision of RLF and RLM is higher.

As an optional implementation manner, in a case that the terminal detects the monitoring object in the first period, it is determined that the monitoring object is present in the first period; or in a case that the terminal does not detect the monitoring object in the first period, the terminal determines that the monitoring object is not present in the first period.

That the monitoring object is detected in the first period may be: it is detected that the monitoring object is sent in the first period, for example, the terminal may detect whether the network device or other terminals send the monitoring object in the first period through a receiver. For example: in a case that the monitoring object is RS, the terminal may determine that the terminal detects whether to send RS through sequence-related detection; in a case that it is detected that the RS is sent, it is considered that RS is present; otherwise, it is considered that RS is not present.

In this implementation manner, it may be determined whether the monitoring object is present in the first period through whether the terminal detects the monitoring object in the first period, thereby accurately determining whether the monitoring object is present in the first period.

As an optional implementation manner, the first period is an indication period in the evaluation period, in a case that a monitoring object is not present in a first part indication period in the evaluation period, but a monitoring object is present in a second part indication period in the evaluation period, the behavior includes evaluating link quality and/or reporting link quality information, and the evaluating link quality is to evaluate the link quality based on the monitoring object in the second part indication period, the reporting link quality information is to report link quality information based on the evaluated link quality information, and the evaluated link quality is the link quality which is evaluated on the basis of the monitoring object in the second part indication period.

In this implementation manner, the precision of link monitoring quality can be improved on the basis of evaluating link quality in the indication period in which the monitoring object is present and reporting link quality information.

Figure 6:
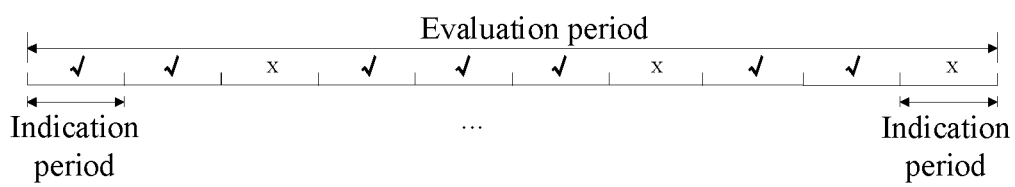
FIG. 6 is a schematic diagram of another evaluation period according to an embodiment of the present disclosure.

For example, as shown in FIG. 6, the length of the evaluation period of the terminal is W times the indication period. In the current indication period, the terminal evaluates the link quality based on RS in the current indication period and RS in the previous W−1 indication periods.

In a case that RS is unavailable in part of the indication periods in the current evaluation period, the terminal performs RLM-BFD measurement and evaluation according to the available RS in the evaluation period, and reports link quality according to an existing rule.

In the embodiments of the present disclosure, according to whether a monitoring object is present in the first period, a link monitoring behavior is determined, and the behavior includes at least one of the following: reporting link quality information, not reporting link quality information, evaluating link quality or not evaluating link quality. In this way, the link monitoring behavior can be determined according to the actual situation of whether a monitoring object is present in the period, so that the link monitoring ability of the terminal can be improved.

Figure 7:
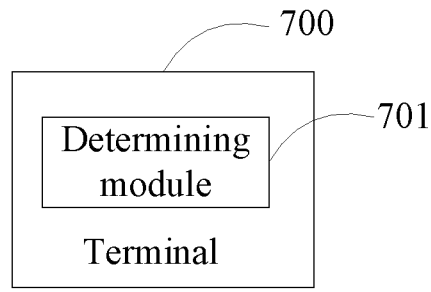
FIG. 7 is a structural diagram of a terminal according to an embodiment of the present disclosure.

Referring to FIG. 7, FIG. 7 is a structural diagram of a terminal according to an embodiment of the present disclosure. As shown in FIG. 7, the terminal 700 includes:

a determination module 701, configured to, according to whether a monitoring object is present in a first period, determine a link monitoring behavior, and the behavior includes at least one of the following:

reporting link quality information, not reporting link quality information, evaluating link quality or not evaluating link quality.

In some embodiments, the first period includes one or a plurality of indication periods.

In some embodiments, the monitoring object includes:

a monitoring object of Radio Link Monitoring (RLM) or a monitoring object of Beam Failure Detection (BFD).

In some embodiments, the monitoring object of the RLM includes at least one of the following:

SSB, CSI-RS, a Demodulation Reference Signal (DMRS) and Hybrid Automatic Repeat Request (HARQ) information; and the monitoring object of the BFD includes at least one of the following:

SSB, CSI-RS, DMRS, and HARQ information.

In some embodiments, the monitoring object is configured by a network, pre-defined, pre-configured, or indicated by a sidelink terminal.

In some embodiments, in a case that a monitoring object is not present in the first period, the behavior includes not reporting link quality information or not evaluating link quality.

In some embodiments, N monitoring objects are monitored in the first period, in a case that M monitoring objects are not present in the first period, the behavior includes: not reporting link quality information, N is an integer greater than or equal to 1, and the M is an integer less than or equal to the N.

In some embodiments, in a case that a first monitoring object is not present in the first period, but a second monitoring object is present, the behavior includes: evaluating link quality not based on the first monitoring object and evaluating link quality based on the second monitoring object.

Figure 8:
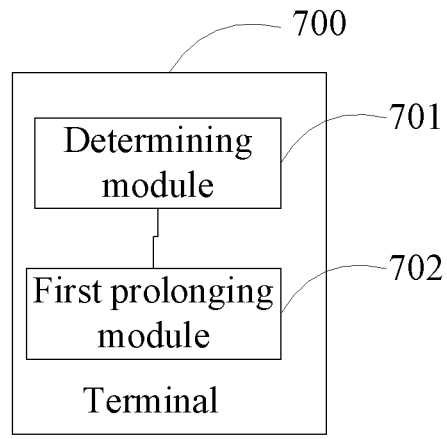
FIG. 8 is a structural diagram of another terminal according to an embodiment of the present disclosure.

In some embodiments, the monitoring object includes a third monitoring object, the first period is an indication period corresponding to the third monitoring object, the evaluation period includes K indication periods, and K is an integer greater than or equal to 1. As shown in FIG. 8, the terminal 700 further includes:

a prolonging module 702, configured to, in a case that the third monitoring object is not present in an indication period in the evaluation period, prolong the evaluation period by one or a plurality of indication periods, and the prolonged part is located before the starting indication period of the evaluation period.

In some embodiments, the first prolonging module 702 is configured to, in a case that the third monitoring object is not present in J indication periods in the evaluation period, prolong the evaluation period by J indication periods, or prolong the evaluation period until the prolonged indication period includes J indication periods for monitoring the third monitoring object, and the J is an integer less than or equal to the K; or the first prolonging module 702 is configured to, in a case that the third monitoring object is present in the first period and the third monitoring object is not present in at least one indication period in the evaluation period, prolong the evaluation period by one or a plurality of indication periods.

Figure 9:
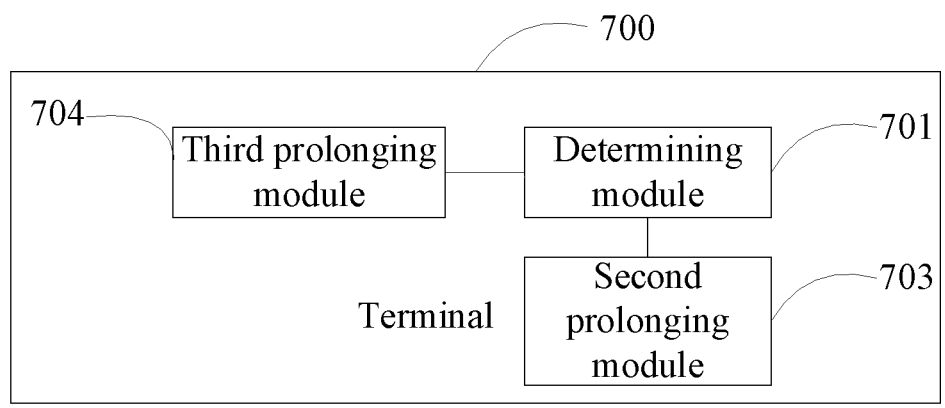
FIG. 9 is a structural diagram of another terminal according to an embodiment of the present disclosure.

In some embodiments, as shown in FIG. 9, the terminal 700 further includes at least one of the following:

a second prolonging module 703, configured to, in a case that the terminal runs a radio link failure (RLF) timer and a monitoring object is not present in the first period, prolong a duration of the RLF timer; and a third prolonging module 704, configured to, in a case that the terminal runs a beam failure detection timer and a monitoring object is not present in the first period, prolong a duration of the beam failure detection timer.

In some embodiments, in a case that the terminal detects the monitoring object in the first period, it is determined that the monitoring object is present in the first period; and/or in a case that the terminal does not detect the monitoring object in the first period, the terminal determines that the monitoring object is not present in the first period.

In some embodiments, the first period is an indication period in the evaluation period, in a case that a monitoring object is not present in a first part of indication periods in the evaluation period, but a monitoring object is present in a second part of indication periods in the evaluation period, the behavior includes: evaluating link quality and/or reporting link quality information, the evaluating link quality is to evaluate the link quality based on the monitoring object in the second part indication period, the reporting link quality information is to report link quality information based on the evaluated link quality information, and the evaluated link quality is the link quality which is evaluated on the basis of the monitoring object in the second part indication period.

In some embodiments, the reporting link quality information refers to reporting link quality information to a medium access control (MAC) layer or a layer 3 of the terminal; and/or the not reporting link quality information refers to not reporting link quality information to the MAC layer or the layer 3 of the terminal.

The terminal provides by the embodiments of the present disclosure can implement various processes implemented by the terminal in the method embodiment in FIG. 2. To avoid repetition, details are not described herein again, and the link monitoring ability of the terminal can be improved.

Figure 10:
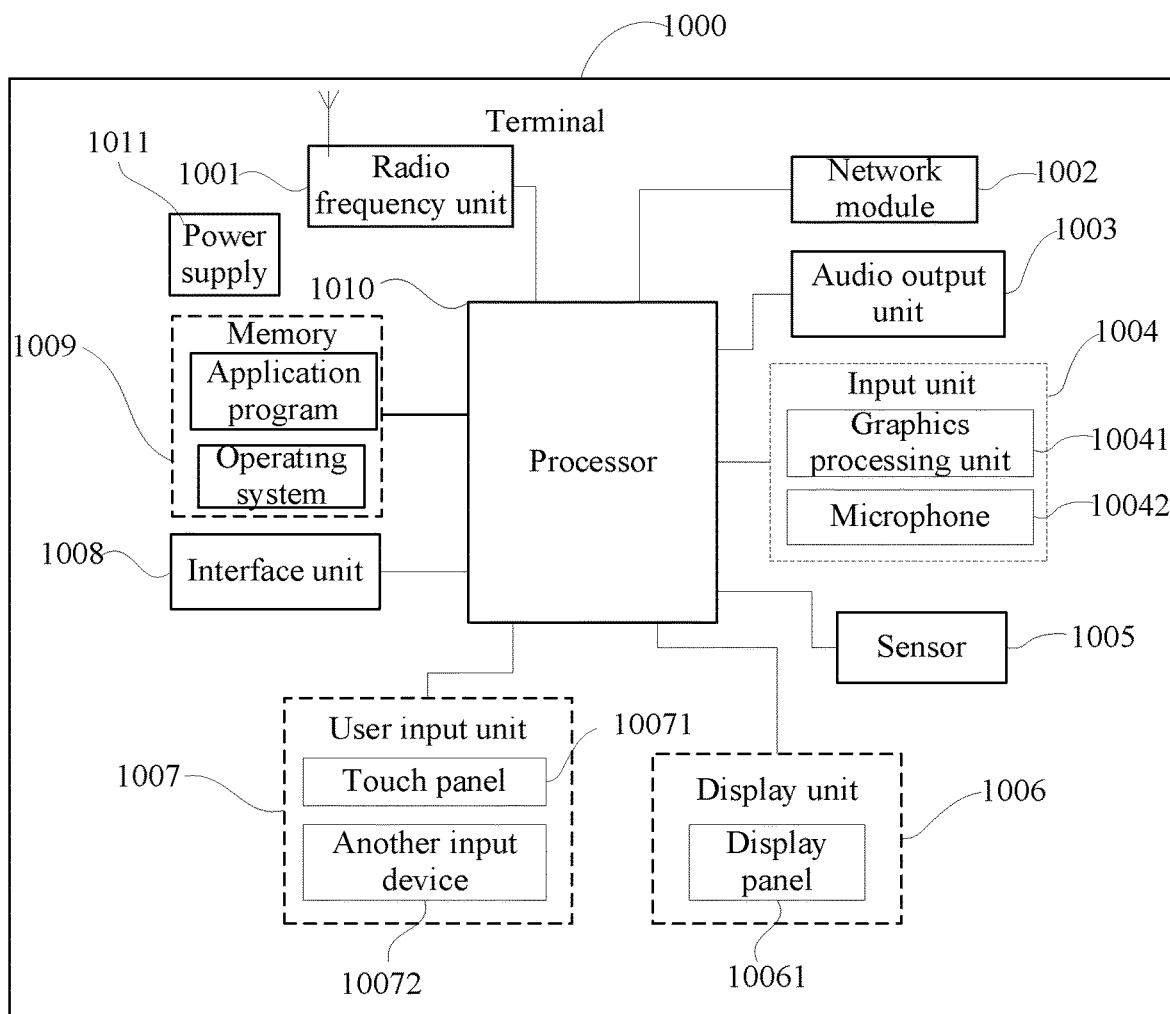
FIG. 10 is a structural diagram of another terminal according to an embodiment of the present disclosure.

FIG. 10 is a schematic diagram of a hardware structure of a terminal for implementing embodiments of the present disclosure.

The terminal 1000 includes but is not limited to: a radio frequency unit 1001, a network module 1002, an audio output unit 1003, an input unit 1004, a sensor 1005, a display unit 1006, a user input unit 1007, an interface unit 1008, a memory 1009, a processor 1010, a power supply 1011 and the like. A person skilled in the art may understand that a structure of the terminal shown in FIG. 10 does not constitute a limitation to the terminal, and the terminal may include more or fewer components than those shown in the figure, or combine some components, or have different component arrangements. In this embodiment of the present disclosure, the terminal includes but is not limited to a mobile phone, a tablet computer, a laptop computer, a palmtop computer, an in-vehicle terminal, a robot, a wearable device, a pedometer, and the like.

The processor 1010 is configured to, according to whether a monitoring object is present in a first period, determine a link monitoring behavior, and the behavior includes at least one of the following:

reporting link quality information, not reporting link quality information, evaluating link quality or not evaluating link quality.

In some embodiments, the first period includes one or a plurality of indication periods.

In some embodiments, the monitoring object includes:

a monitoring object of radio link monitoring (RLM) or a monitoring object of beam failure detection (BFD).

In some embodiments, the monitoring object of the RLM includes at least one of the following:

SSB, CSI-RS, a demodulation reference signal (DMRS) and hybrid automatic repeat request (HARQ) information; and the monitoring object of the BFD includes at least one of the following:

SSB, CSI-RS, DMRS and hybrid automatic repeat request (HARQ) information.

In some embodiments, the monitoring object is configured by a network, pre-defined, pre-configured or indicated by a sidelink terminal.

In some embodiments, in a case that a monitoring object is not present in the first period, the behavior includes not reporting link quality information or not evaluating link quality.

In some embodiments, N monitoring objects are monitored in the first period, in a case that M monitoring objects are not present in the first period, the behavior includes: not reporting link quality information, N is an integer greater than or equal to 1, and the M is an integer less than or equal to the N.

In some embodiments, in a case that a first monitoring object is not present in the first period, but a second monitoring object is present, the behavior includes: evaluating link quality not based on the first monitoring object and evaluating link quality based on the second monitoring object.

In some embodiments, the monitoring object includes a third monitoring object, the first period is an indication period corresponding to the third monitoring object, the evaluation period includes K indication periods, and K is an integer greater than or equal to 1. The processor 1010 is further configured to:

in a case that the third monitoring object is not present in an indication period in the evaluation period, prolonging the evaluation period by one or a plurality of indication periods, where the prolonged part is located before the starting indication period of the evaluation period.

In some embodiments, the step "in a case that the third monitoring object is not present in an indication period in the evaluation period, prolonging the evaluation period by one or a plurality of indication periods" includes:

in a case that the third monitoring object is not present in J indication periods in the evaluation period, prolong the evaluation period by J indication periods, or prolong the evaluation period until the prolonged indication period includes J indication periods for monitoring the third monitoring object, and the J is an integer less than or equal to the K; or in a case that the third monitoring object is present in the first period and the third monitoring object is not present in at least one indication period in the evaluation period, prolong the evaluation period by one or a plurality of indication periods.

In some embodiments, the processor 1010 is further configured to perform at least one of the following:

in a case that the terminal runs a RLF timer and a monitoring object is not present in the first period, prolonging a duration of the RLF timer; and in a case that the terminal runs a beam failure detection timer and a monitoring object is not present in the first period, prolonging a duration of the beam failure detection timer.

In some embodiments, in a case that the terminal detects the monitoring object in the first period, it is determined that the monitoring object is present in the first period; and/or in a case that the terminal does not detect the monitoring object in the first period, the terminal determines that the monitoring object is not present in the first period.

In some embodiments, the first period is an indication period in the evaluation period, in a case that a monitoring object is not present in a first part indication period in the evaluation period, but a monitoring object is present in a second part indication period in the evaluation period, the behavior includes evaluating link quality and/or reporting link quality information, and the evaluating link quality is to evaluate the link quality based on the monitoring object in the second part indication period, the reporting link quality information is to report link quality information based on the evaluated link quality information, and the evaluated link quality is the link quality which is evaluated on the basis of the monitoring object in the second part indication period.

In some embodiments, the reporting link quality information refers to reporting link quality information to a Medium Access Control (MAC) layer or a layer 3 of the terminal; and/or the not reporting link quality information refers to not reporting link quality information to the MAC layer or the layer 3 of the terminal.

The foregoing terminal can improve the transmission performance of the sidelink.

It should be understood that in this embodiment of the present disclosure, the radio frequency unit 1001 may be configured to receive and transmit information, or receive and transmit signals during a call. Specifically, the radio frequency unit receives downlink data from a base station, and transmits the downlink data to the processor 1010 for processing; and transmits uplink data to the base station. Generally, the radio frequency unit 1001 includes, but is not limited to, an antenna, at least one amplifier, a transceiver, a coupler, a low noise amplifier, a duplexer, and the like. In addition, the radio frequency unit 1001 may further communicate with another device by using a wireless communications system and network.

The terminal provides wireless broadband Internet access to a user through the network module 1002, for example, helps the user receive and send e-mails, browse web pages, access streaming media, and the like.

The audio output unit 1003 may convert audio data received by the radio frequency unit 1001 or the network module 1002 or stored in the memory 1009 into an audio signal, and output the audio signal into sound. In addition, the audio output unit 1003 may further provide an audio output (for example, a call signal received voice, or a message received voice) related to a specific function implemented by the terminal 1000. The audio output unit 1003 includes a loudspeaker, a buzzer, a receiver, and the like.

The input unit 1004 is configured to receive an audio signal or a video signal. The input unit 1004 may include a Graphics Processing Unit (GPU) 10041 and a microphone 10042. The GPU 10041 processes image data of a static image or video obtained by an image capture apparatus (such as, a camera) in a video capture mode or an image capture mode. A processed image frame may be displayed on the display unit 1006. The image frame processed by the GPU 10041 may be stored in the memory 1009 (or another storage medium) or sent by using the radio frequency unit 1001 or the network module 1002. The microphone 10042 may receive a sound and can process such a sound into audio data. The processed audio data may be converted, in a call mode, into a format that may be sent to a mobile communication base station by using the radio frequency unit 1001 for output.

The terminal 1000 further includes at least one sensor 1005, for example, a light sensor, a motion sensor, and another sensor. Specifically, the light sensor includes an ambient light sensor and a proximity sensor. The ambient light sensor may adjust luminance of the display panel 10061 based on brightness of ambient light. The proximity sensor may turn off the display panel 10061 and/or backlight when the terminal 1000 is moved to an ear. As a type of the motion sensor, an accelerometer sensor may detect an acceleration value in each direction (generally, three axes), and detect a value and a direction of gravity when the accelerometer sensor is static, and may be used in an application for recognizing a mobile terminal posture (such as screen switching between landscape and portrait modes, a related game, or magnetometer posture calibration), a function related to vibration recognition (such as a pedometer or a knock), and the like. The sensor 1005 may further include a fingerprint sensor, a pressure sensor, an iris sensor, a molecular sensor, a gyroscope, a barometer, a hygrometer, a thermometer, an infrared sensor, and the like. Details are not described herein.

The display unit 1006 is configured to display information entered by a user or information provided for a user. The display unit 1006 may include a display panel 10061, and the display panel 10061 may be configured in a form of a Liquid Crystal Display (LCD), an Organic Light-Emitting Diode (OLED), or the like.

The user input unit 1007 may be configured to receive input digit or character information and generate key signal input related to user setting and function control of the terminal. Specifically, the user input unit 1007 includes a touch panel 10071 and another input device 10072. The touch panel 10071 is also referred to as a touchscreen, and may collect a touch operation performed by the user on or near the touch panel 10071 (for example, an operation performed on or near the touch panel 10071 by the user by using any appropriate object or accessory such as a finger or a stylus). The touch panel 10071 may include two parts: a touch detection apparatus and a touch controller. The touch detection apparatus detects a touch position of a user, detects a signal brought by a touch operation, and transmits the signal to the touch controller. The touch controller receives touch information from the touch detection apparatus, converts the touch information into contact coordinates, sends the contact coordinates to the processor 1010, and receives and executes a command from the processor 1010. In addition, the touch panel 10071 may be implemented by various types, such as a resistive type, a capacitive type, an infrared type, a surface acoustic wave type, or the like. In addition to the touch panel 10071, the user input unit 1007 may further include another input device 10072. Specifically, the input device 10072 may include but is not limited to a physical keyboard, function keys (for example, a volume control key and an on/off key), a trackball, a mouse, and a joystick. Details are not described herein again.

Further, the touch panel 10071 can cover the display panel 10061. When detecting a touch operation on or near the touch panel, the touch panel 10071 transmits the touch operation to the processor 1010 to determine a type of a touch event. Then the processor 1010 provides a corresponding visual output on the display panel 10061 based on the type of the touch event. Although in FIG. 10, the touch panel 10071 and the display panel 10061 are used as two independent components to implement input and output functions of the terminal, in some embodiments, the touch panel 10071 and the display panel 10061 may be integrated to implement the input and output functions of the mobile terminal. This is not specifically limited herein.

The interface unit 1008 is an interface connecting an external apparatus to the terminal 1000. For example, the external apparatus may include a wired or wireless headphone port, an external power supply (or a battery charger) port, a wired or wireless data port, a storage card port, a port used to connect to an apparatus having an identity module, an audio input/output (I/O) port, a video I/O port, a headset port, and the like. The interface unit 1008 may be configured to receive input (for example, data information and power) from the external apparatus and transmit the received input to one or more elements in the terminal 1000, or may be configured to transmit data between the terminal 1000 and the external apparatus.

The memory 1009 may be configured to store software programs and various data. The memory 1009 may mainly include a program storage area and a data storage area. The program storage area may store an operating system, an application required by at least one function (for example, a sound play function or an image display function), and the like. The data storage area may store data (for example, audio data or an address book) or the like created based on use of the mobile phone. In addition, the memory 1009 may include a high-speed random access memory, and may further include a non-volatile memory such as at least one magnetic disk storage device, a flash memory device, or another volatile solid-state storage device.

The processor 1010 is a control center of the terminal, and connects all parts of the entire terminal by using various interfaces and lines. By running or executing a software program and/or a module stored in the memory 1009 and invoking data stored in the memory 1009, the processor 1010 performs various functions of the terminal and data processing, to perform overall monitoring on the terminal. The processor 1010 may include one or more processing units. The processor 1010 may be integrated with an application processor and a modem processor. The application processor mainly processes the operating system, the user interface, applications, etc. The modem processor mainly processes wireless communication. It may be understood that, alternatively, the modem processor may not be integrated into the processor 1010.

The terminal 1000 may further include the power supply 1011 (such as a battery) that supplies power to each component. The power supply 1011 may be logically connected to the processor 1010 by using a power management system, so as to implement functions such as charging, discharging, and power consumption management by using the power management system.

In addition, the terminal 1000 includes some functional modules that are not shown. Details are not described herein.

The embodiments of the present disclosure further provide a terminal, including a processor 1010, a memory 1009, and a computer program that stored in the memory 1009 and capable of running on the processor 1010. When the computer program is executed by the processor 1010, the processes of the link monitoring method embodiment are implemented, and a same technical effect can be achieved. To avoid repetition, details are not described herein again.

The embodiments of the present disclosure further provide a non-transitory computer-readable storage medium. The non-transitory computer-readable storage medium stores a computer program; and when the computer program is executed by a processor, the link monitoring method provided in the embodiments of the present disclosure are implemented, and the same technical effect can be achieved. To avoid repetition, details are not described herein again. The non-transitory computer-readable storage medium is, for example, a Read-Only Memory (ROM), a Random Access Memory (RAM), a magnetic disk, or an optical disk.

It should be noted that in this specification, the terms "comprise", "include" and any other variants thereof are intended to cover non-exclusive inclusion, so that a process, a method, an article, or an apparatus that includes a series of elements not only includes these very elements, but may also include other elements not expressly listed, or also include elements inherent to this process, method, article, or apparatus. An element limited by "includes a . . . " does not, without more constraints, preclude the presence of additional identical elements in the process, method, article, or apparatus that includes the element.

Based on the foregoing descriptions of the embodiments, a person skilled in the art may clearly understand that the method in the foregoing embodiment may be implemented by software in addition to a necessary universal hardware platform or by hardware only. In most circumstances, the former is a preferred implementation. Based on such understanding, the technical solutions of the present disclosure essentially or the part contributing to the prior art may be implemented in a form of a software product. The computer software product is stored in a storage medium (such as a ROM/RAM, a hard disk, or an optical disc), and includes several instructions for instructing a terminal (which may be a mobile phone, a computer, a server, an air conditioner, a network device, or the like) to perform the methods described in the embodiments of the present disclosure.

It can be understood that the embodiments of the present disclosure may be implemented by hardware, software, firmware, middleware, microcode, or a combination thereof. For implementation with hardware, the module, unit, submodule, subunit, and the like may be implemented in one or more Application Specific Integrated Circuit (ASIC), a Digital Signal Processor (DSP), a DSP Device (DSPD), a Programmable Logic Device (PLD), a Field-Programmable Gate Array (FPGA), a general-purpose processor, a controller, a microcontroller, a microprocessor, another electronic unit for implementing the functions of the present application, or a combination thereof.

The embodiments of the present disclosure are described above with reference to the accompanying drawings, but the present disclosure is not limited to the foregoing specific implementations. The foregoing specific implementations are merely exemplary instead of restrictive. Under enlightenment of the present disclosure, a person of ordinary skill in the art may make many forms without departing from the aims of the present disclosure and the protection scope of claims, all of which fall within the protection scope of the present disclosure.

The invention claimed is:

1. A method of link monitoring, performed by a terminal, comprising:
    according to whether a monitoring object is present in a first period, determining a link monitoring behavior, wherein the behavior comprises at least one of the following:
    reporting link quality information, not reporting link quality information, evaluating link quality, or not evaluating link quality,
    wherein the first period is an indication period in the evaluation period, wherein when a monitoring object is not present in a first part indication period in the evaluation period, but a monitoring object is present in a second part indication period in the evaluation period, the behavior comprises evaluating link quality or reporting link quality information, and
    wherein the evaluating link quality is to evaluate the link quality based on the monitoring object in the second part indication period, the reporting link quality information is to report link quality information based on the evaluated link quality information, and the evaluated link quality is the link quality which is evaluated on the basis of the monitoring object in the second part indication period.

2. The method according to claim 1, wherein the monitoring object comprises:
    a monitoring object of Radio Link Monitoring (RLM) or a monitoring object of Beam Failure Detection (BFD), wherein the monitoring object of the RLM comprises at least one of the following:
    a Channel-State Information Reference Signal (CSI-RS), a Synchronization Signal Block (SSB), a Demodulation Reference Signal (DMRS) and Hybrid Automatic Repeat Request (HARQ) information; or
    the monitoring object of the BFD comprises at least one of the following:
    a CSI-RS, an SSB, a DMRS, or HARQ information.

3. The method according to claim 1, wherein when a monitoring object is not present in the first period, the behavior comprises: not reporting link quality information or not evaluating link quality.

4. The method according to claim 1, wherein N monitoring objects are monitored in the first period, when M monitoring objects among the N monitoring objects are not present in the first period, the behavior comprises: not reporting link quality information, wherein N is an integer greater than or equal to 1, and M is an integer no less than 1 but no greater than N.

5. The method according to claim 1, wherein when a first monitoring object is not present in the first period, but a second monitoring object is present, the behavior comprises: evaluating link quality not based on the first monitoring object and evaluating link quality based on the second monitoring object.

6. The method according to claim 1, wherein the monitoring object comprises a third monitoring object, the first period is an indication period corresponding to the third monitoring object; and the method further comprises:
    when the third monitoring object is not present in an indication period in the evaluation period, prolonging the evaluation period by one or a plurality of indication periods, wherein a prolonged part is located before the starting indication period of the evaluation period.

7. The method according to claim 6, wherein when the third monitoring object is not present in the indication period in the evaluation period, the prolonging the evaluation period by one or a plurality of indication periods comprises:
when the third monitoring object is not present in J indication periods in the evaluation period, prolonging the evaluation period by J indication periods, or prolonging the evaluation period until the prolonged indication period comprises J indication periods for monitoring the third monitoring object, wherein the J is an integer less than or equal to the K; or
when the third monitoring object is present in the first period and the third monitoring object is not present in at least one indication period in the evaluation period, prolonging the evaluation period by one or a plurality of indication periods.

8. The method according to claim 1, further comprising at least one of the following:
when the terminal runs a Radio Link Failure (RLF) timer and a monitoring object is not present in the first period, prolonging a duration of the RLF timer; or
when the terminal runs a beam failure detection timer and a monitoring object is not present in the first period, prolonging a duration of the beam failure detection timer.

9. The method according to claim 1, further comprising:
when the terminal detects the monitoring object in the first period, determining that a first monitoring object is present in the first period; and
when the terminal does not detect the monitoring object in the first period, determining that the monitoring object is not present in the first period.

10. The method according to claim 1, wherein the reporting link quality information comprises reporting link quality information to a Media Access Control (MAC) layer or a layer 3 of the terminal; or
the not reporting link quality information comprises not reporting link quality information to the MAC layer or the layer 3 of the terminal.

11. A terminal, comprising:
a memory storing a computer program; and
a processor coupled to the memory and configured to execute the computer program to perform a method of link monitoring, the method comprising:
according to whether a monitoring object is present in a first period, determining a link monitoring behavior, wherein the behavior comprises at least one of the following:
reporting link quality information, not reporting link quality information, evaluating link quality or not evaluating link quality,
wherein the first period is an indication period in the evaluation period, wherein when a monitoring object is not present in a first part indication period in the evaluation period, but a monitoring object is present in a second part indication period in the evaluation period, the behavior comprises evaluating link quality or reporting link quality information, and
wherein the evaluating link quality is to evaluate the link quality based on the monitoring object in the second part indication period, the reporting link quality information is to report link quality information based on the evaluated link quality information, and the evaluated link quality is the link quality which is evaluated on the basis of the monitoring object in the second part indication period.

12. The terminal according to claim 11, wherein the monitoring object comprises:
a monitoring object of Radio Link Monitoring (RLM) or a monitoring object of Beam Failure Detection (BFD), wherein the monitoring object of the RLM comprises at least one of the following:
a Channel-State Information Reference Signal (CSI-RS), a Synchronization Signal Block (SSB), a Demodulation Reference Signal (DMRS) and Hybrid Automatic Repeat Request (HARQ) information; or
the monitoring object of the BFD comprises at least one of the following:
a CSI-RS, an SSB, a DMRS, or HARQ information.

13. The terminal according to claim 11, wherein when a monitoring object is not present in the first period, the behavior comprises: not reporting link quality information or not evaluating link quality.

14. The terminal according to claim 11, wherein N monitoring objects are monitored in the first period, when M monitoring objects among the N monitoring objects are not present in the first period, the behavior comprises: not reporting link quality information, wherein N is an integer greater than or equal to 1, and M is an integer no less than 1 or equal to the but no greater than N.

15. The terminal according to claim 11, wherein when a first monitoring object is not present in the first period, but a second monitoring object is present, the behavior comprises: evaluating link quality not based on the first monitoring object and evaluating link quality based on the second monitoring object.

16. The terminal according to claim 11, wherein the monitoring object comprises a third monitoring object, the first period is an indication period corresponding to the third monitoring object;
wherein the method further comprises:
when the third monitoring object is not present in an indication period in the evaluation period, prolonging the evaluation period by one or a plurality of indication periods, wherein a prolonged part is located before the starting indication period of the evaluation period.

17. The terminal according to claim 16, wherein when the third monitoring object is not present in an indication period in the evaluation period, the prolonging the evaluation period by one or a plurality of indication periods comprises:
when the third monitoring object is not present in J indication periods in the evaluation period, prolonging the evaluation period by J indication periods, or prolonging the evaluation period until the prolonged indication period comprises J indication periods for monitoring the third monitoring object, wherein the J is an integer less than or equal to the K; or
when the third monitoring object is present in the first period and the third monitoring object is not present in at least one indication period in the evaluation period, prolonging the evaluation period by one or a plurality of indication periods.

18. The terminal according to claim 11, performing the method of link monitoring further comprising at least one of the following:
when the terminal runs a Radio Link Failure (RLF) timer and a monitoring object is not present in the first period, prolonging a duration of the RLF timer; or when the terminal runs a beam failure detection timer and a monitoring object is not present in the first period, prolonging a duration of the beam failure detection timer.

19. A non-transitory computer-readable storage medium, wherein the computer-readable storage medium stores a computer program, and when the computer program is executed by a processor, performs a method of link monitoring, the method comprising:

according to whether a monitoring object is present in a first period, determining a link monitoring behavior, wherein the behavior comprises at least one of the following:

reporting link quality information, not reporting link quality information, evaluating link quality or not evaluating link quality, wherein the first period is an indication period in the evaluation period, wherein when a monitoring object is not present in a first part indication period in the evaluation period, but a monitoring object is present in a second part indication period in the evaluation period, the behavior comprises evaluating link quality or reporting link quality information, and wherein the evaluating link quality is to evaluate the link quality based on the monitoring object in the second part indication period, the reporting link quality information is to report link quality information based on the evaluated link quality information, and the evaluated link quality is the link quality which is evaluated on the basis of the monitoring object in the second part indication period.

* * * * *